(12) United States Patent
Wahrén et al.

(10) Patent No.: US 10,908,596 B2
(45) Date of Patent: Feb. 2, 2021

(54) CONVEYOR SYSTEM METHOD OF OPERATING A CONVEYOR SYSTEM AND FLOW DEVICES FOR USE IN SUCH CONVEYOR SYSTEM

(71) Applicant: EWAB ENGINEERING AB, Vadstena (SE)

(72) Inventors: Mats Wahrén, Vadstena (SE); Roland Lundin, Vadstena (SE); Anders Axman, Vadstena (SE)

(73) Assignee: Ewab Engineering AB, Vadstena (SE)

( * ) Notice: Subject to any disclaimer, the term of this patent is extended or adjusted under 35 U.S.C. 154(b) by 0 days.

(21) Appl. No.: 16/623,542

(22) PCT Filed: Jun. 20, 2018

(86) PCT No.: PCT/EP2018/066440
§ 371 (c)(1),
(2) Date: Dec. 17, 2019

(87) PCT Pub. No.: WO2018/234388
PCT Pub. Date: Dec. 27, 2018

(65) Prior Publication Data
US 2020/0142387 A1 May 7, 2020

(30) Foreign Application Priority Data
Jun. 21, 2017 (EP) .................... 17177077

(51) Int. Cl.
*B65G 43/00* (2006.01)
*B65G 47/52* (2006.01)
*G05B 19/418* (2006.01)

(52) U.S. Cl.
CPC ..... *G05B 19/4185* (2013.01); *G05B 19/4189* (2013.01); *G05B 2219/2621* (2013.01);
(Continued)

(58) Field of Classification Search
None
See application file for complete search history.

(56) References Cited

U.S. PATENT DOCUMENTS 7,669,706 B2 * 3/2010 McLaughlin ............. B07C 3/02
198/349
7,904,182 B2 * 3/2011 Hosek ................ G05B 19/4148
700/1
(Continued)

FOREIGN PATENT DOCUMENTS

CN 20223174 U 5/2012
DE 4415763 A1 11/1995
(Continued)

OTHER PUBLICATIONS

International Search Report PCT/EP2018/066440 dated Aug. 24, 2018.
(Continued)

*Primary Examiner* — Kavel Singh
(74) *Attorney, Agent, or Firm* — Olive Law Group, PLLC

(57) ABSTRACT

The present document discloses a conveyor system comprising a plurality of workpiece carriers, each adapted for supporting at least one workpiece during transportation, a conveyor, adapted for transporting the workpiece carriers, at least one flow device for controlling a movement of one of the workpiece carriers relative to the conveyor, the flow device comprising a local controller, at least one workpiece carrier sensor and at least one actuator, and a central controller, which is in data communication with the flow device, and having a memory containing a flow plan comprising data describing an intended flow of workpieces in the conveyor system.

17 Claims, 3 Drawing Sheets

(52) U.S. Cl.
CPC .............. *G05B 2219/32121* (2013.01); *G05B 2219/45054* (2013.01)

(56) References Cited

U.S. PATENT DOCUMENTS

| | | | |
|---|---|---|---|
| 7,909,155 B2* | 3/2011 | Lupton | .................. B65G 43/08 198/357 |
| 9,150,362 B2* | 10/2015 | Vegh | .................. G05B 19/4189 |
| 9,242,800 B2* | 1/2016 | Sullivan | ............... B65G 1/0492 |
| 2002/0185358 A1 | 12/2002 | Zeitler et al. | |
| 2012/0024666 A1 | 2/2012 | Baier et al. | |

FOREIGN PATENT DOCUMENTS

| | | |
|---|---|---|
| DE | 102009031137 A1 | 10/2010 |
| EP | 2133291 A1 | 12/2009 |
| EP | 2566313 A1 | 3/2013 |
| EP | 2198567 B1 | 1/2014 |
| EP | 2856174 B1 | 5/2016 |

OTHER PUBLICATIONS

Decision to Grant under Rule 71(3) for the corresponding European application (publication number: EP3418834), dated Oct. 2, 2020.
Notification to Grant for the corresponding Chinese application (publication number: CN 110832414 A) dated Oct. 9, 2020.

* cited by examiner

CONVEYOR SYSTEM METHOD OF OPERATING A CONVEYOR SYSTEM AND FLOW DEVICES FOR USE IN SUCH CONVEYOR SYSTEM

CROSS REFERENCE TO RELATED APPLICATIONS

This application is a 35 USC 371 application of International PCT Patent Application No. PCT/EP2018/066440, filed on Jun. 20, 2018, which claims priority to European Patent Application No. 17177077.9, filed on Jun. 21, 2017; the contents of which are hereby incorporated by reference herein in their entireties.

TECHNICAL FIELD

The present disclosure relates to a conveyor system for moving workpieces between a set of operating stations.

The conveyor system is suitable for providing an automated production system, i.e. a system wherein workpieces are transported between operation stations without human intervention.

BACKGROUND

Conveyor systems are used in many types of manufacturing industries for moving workpieces between different types of operation stations.

Setting up such a conveyor system usually involves a large amount of programming; the control software needs to handle each sensor and each actuator as well as to keep track of each workpiece and each operation station.

When changing the manufacturing system, it is usually a very challenging task to install or remove an operating station and to rebalance the system, such that no unintentional buffers are formed. This also involves modifying the control software, which usually involves a significant amount of labor.

Moreover, wear and stoppages may cause the system to drift over time, causing a need for rebalancing, which in turn requires reprogramming of the control software.

In conveyor systems for automated production, it is known to receive all sensor data in a central controller, and to send out instructions to actuators from this central controller. Consequently, all functions in the conveyor system are centrally controlled; every start, stop, track switch, data collection and data generation is controlled directly by the central controller.

Consequently, there is a need for a substantial amount of wiring, as well as programming, to set up such a conveyor system.

On the other hand, there is a need to reduce costs for designing, building and configuring conveyor systems.

SUMMARY

Hence, a general object is to provide an improved centrally controlled conveyor system, and in particular such a system which can be installed and maintained at lower cost and which preferably is more robust.

The invention is defined by the appended independent claim, with embodiments being set forth in the following description and in the drawings.

According to a first aspect, there is provided a conveyor system, comprising a plurality of workpiece carriers, each adapted for supporting at least one workpiece during transportation, a conveyor, adapted for transporting the workpiece carriers, at least one flow device for controlling a movement of one of the workpiece carriers relative to the conveyor, the flow device comprising a local controller, at least one workpiece carrier sensor and at least one actuator, and a central controller, which is in data communication with the flow device, and having a memory containing a flow plan comprising data describing an intended flow of workpieces in the conveyor system. The local controller is configured to receive a sensor signal via a signal interface, convert the sensor signal into signal data having a predetermined data format, communicate the sensor data to the central controller via a data interface, receive command data from the central controller via the data interface, and provide an actuator control signal to the actuator based on the command data.

A flow plan is a set of instructions that describe the way or ways a workpiece is to be transported by the conveyor system. The flow plan may be fixed, in the sense that it can only be altered by operator intervention, optionally in connection with the conveyor system being shut down, or dynamic, in the sense that it may be changed in response to events occurring in the production process. Such changes may be effected automatically, by a control system, or by operator intervention.

The local controller may be configured to determine, based on the sensor signal and/or sensor data, whether to override said steps of communicating the sensor data to the central controller and receiving the command data from the central controller, and then to autonomously generate the command data.

Hence, if it is decided to override, the local controller will itself generate the command data and carry it out, without prior communication with the central controller. This may reduce the amount of information that needs to be communicated with the central controller.

The local controller may be configured to autonomously provide the command data when it determines that the workpiece carrier does not carry a valid workpiece.

Hence, when the workpiece carrier is empty or the workpiece may be, e.g. incorrectly positioned or otherwise faulty, the local controller may make an autonomous decision to stop it and/or to let it pass. Conversely, when the workpiece carrier carries a valid workpiece, the workpiece carrier may instead be subject to central control.

The local controller may be configured to receive the command data in response to said communication of the sensor data.

Hence, this implies that the conveyor system is operating in real-time, i.e. the central controller sends specific command data in response to the specific sensor data received. In other words, the central controller is triggered to make a decision and send the command data only upon receipt of the sensor data. Hence, the command data is provided by the central controller immediately as a consequence of, and in response to, the sensor data that is received by the central controller. Typically, the command data will be received within 15 seconds of the sensor data being sent by the local controller, preferably within 10 seconds, 5 seconds, 1 second or 0.5 second.

Such a configuration of a conveyor system facilitates the design, assembly, maintenance and redesign of a conveyor system.

Since the local controller is configured to convert sensor data into signal data, it is possible to use one data format for all communications between local controller and central controller.

Moreover, there is no need to connect sensors and actuators to a central controller, since the signals to and from actuators and sensors are provided by the local controller.

The central controller may be configured to receive the sensor data from the local controller, determine an action to be taken by the flow device based on the flow plan and on the sensor data, provide the command data to correspond to the action, and send the command data to the local controller.

Hence, the central controller may take its real-time decision based not only on the sensor data, but also based on the flow plan. Thus, the central controller will effectively decide the workpiece carrier's movement, i.e. whether it is to be stopped, released or diverted, with the flow device merely executing commands received from the central controller.

Hence, the command data may be selected from a group consisting of a command to stop the workpiece carrier, a command to release the workpiece carrier and a command to divert the workpiece carrier, e.g. by causing a turnout unit to control an arm that causes the workpiece carrier to move onto another conveyor portion. Moreover, where a tag writer is involved, the command data may also include an indication of data to be written to the tag. Such data may also be provided in response to the sensor data and/or in response to any tag data read from the tag and/or in response to further sensor data and/or based on the flow plan.

The local controller may be configured to communicate the sensor data to the central controller only in reply to a change in sensor data, or in reply to the command data. Hence, the load on the central controller is reduced.

That is, the local controller only communicates with the central controller when there is an event that prompts it to communicate, such as a change in sensor data or a command from the central controller that cannot be carried out or that has been carried out.

Hence, in particular, the local controller may be configured to send updated sensor data in the event of a change in sensor data.

The flow device may be a stop device for stopping a movement of one of the workpiece carriers relative to the conveyor. In such case, the workpiece carrier sensor may comprise a stop control detection device, configured to detect a presence of a workpiece carrier, arriving at the detection device and/or to detect presence of a workpiece on the workpiece carrier. Moreover, the actuator may comprise a stop control actuation device, configured to stop the workpiece carrier's movement relative to the conveyor.

Hence, in one embodiment, the stop device may be configured to stop the workpiece carrier by its own motion. That is, it may stop the workpiece carrier without command data from the central controller.

In another embodiment, the stop device may be configured to stop the workpiece carrier only in response to command data received from the central controller. Hence, the controller will need to issue a stop control command during the time it takes from the sensor to detect the workpiece carrier's presence at or near the stop device, to the workpiece carrier arriving at the actual stop position.

The stop device may further comprise a tag reader and/or writer. The local controller may be a stop local controller, operatively connected to the stop control detection device, to the stop control actuation device and to the tag reader/writer, to receive a detection signal from the stop control detection device, to send a control signal to the stop control actuation device, and to receive/send tag data from/to the tag reader/writer. The stop local controller may be configured to receive the sensor signal from the stop control detection device, receive tag data from the tag reader/writer, communicate the sensor data corresponding to the sensor signal and the tag data to the central controller in the form of a stop event message, receive a stop control command from the central controller, said command comprising an indication to release the workpiece carrier and/or an indication on data to write to the tag, and control the actuator to release the workpiece carrier.

The tag data may comprise ID data and/or address data, and wherein the stop control command comprises an indication to write amended ID data and/or tag data.

By allowing rewriting of tag data, it is possible to provide a system that is partially autonomous, in the sense that one or more steps may be carried out without communication with the central controller. For example a predetermined sub-sequence of operations may be performed autonomously without the central controller being involved, with one or more operations of such sub-sequence providing updated tag data that may indicate what steps have been performed and/or where the workpiece carrier is to go next.

Specifically, it may be possible to rewrite or reset tag data so as to indicate that a workpiece carrier is empty or otherwise does not carry any valid workpiece, whereby such empty or invalid workpiece carriers may flow through the conveyor system without local controllers having to communicate with the central controller. The stop device may be configured to stop the workpiece carrier autonomously, i.e. without interaction with the central controller. Hence, it is possible to defer communication until the local controller has decided that the workpiece carrier is in place and its data has been read.

The stop device may further comprise a workpiece carrier arrival detector, a workpiece carrier in position detector, and/or a workpiece presence detector. Depending on which detector(s) is/are present, the stop event message may further comprise data indicating arrival of a workpiece carrier at the stop flow controller, data indicating whether the workpiece carrier is in a predetermined stop position, and/or data indicating whether a workpiece is present. Hence, further intelligence may be delegated to the local controller; it does not communicate with the central controller until all data has been obtained.

The stop device may further comprise at least one area status detector, configured to detect presence of a workpiece carrier at a downstream side of the stop control actuation device, and in such case, the event message further may comprise data indicating whether the area is clear or not.

The conveyor may be configured to provide at least one Y-cross with an incoming conveyor line and a greater number of outgoing conveyor lines and the flow device may be a switch device for selectively diverting an incoming workpiece carrier to one of the outgoing conveyor lines. In such case, the actuator may comprise a switch actuation device, configured to selectively divert the workpiece carrier to said one of the outgoing conveyor lines, the workpiece carrier sensor may comprise a switch area status detector, configured to detect a presence of a workpiece carrier at a downstream side of the switch actuation device, and the local controller may comprise a switch local controller, operatively connected to the switch actuation device and to the switch area status detector, to send a control signal to the switch actuation device and to receive a detection signal from the area status detector. The local controller may be configured to receive a switch control command from the central controller, receive a signal from the switch area status detector, and send a switch reply message indicating switch area status and switch position.

The switch device may thus be triggered by the switch command, rather than by the arrival of the workpiece carrier. For example, a stop device may be arranged upstream of the switch device, and may not release a stopped workpiece carrier until the switch device has been properly actuated.

The central controller may be configured to determine to which outgoing line the workpiece carrier is to be directed based on the flow plan, send the switch control command to the switch device, indicating a desired switch position, and receive the switch reply message.

The local controller may be configured to determine, based on the sensor signal or sensor data, whether to override said receiving the switch control command from the central controller, said receiving a the signal from the switch area status detector and said sending a switch reply message, and to autonomously control the switch actuation device to assume a desired position.

Hence, it is possible to allow the local controller to autonomously control the switch depending on e.g. tag data, or in a case when the workpiece carrier is empty or the workpiece may be, e.g. incorrectly positioned or otherwise faulty, such that the local controller may make a decision to divert such workpiece carriers. Conversely, when the workpiece carrier carries a valid workpiece, the workpiece carrier may instead be subject to central control. According to a second aspect, there is provided a method of operating a conveyor system comprising a plurality of workpiece carriers, each adapted for supporting at least one workpiece during transportation, at least one conveyor, adapted for transporting the workpiece carriers, at least one flow device for controlling movement of the workpiece carriers relative to the conveyor, comprising a local controller, at least one workpiece carrier sensor and at least one actuator, and a central controller, which is in data communication with the flow device, and having a memory containing a flow plan containing comprising data describing an intended flow of workpieces in the conveyor system. The method comprises receiving a sensor signal at the local controller via a signal interface, converting the sensor signal into a data format to form sensor data, communicating the sensor data to the central controller via a data interface, receiving command data from the central controller via the data interface, providing an actuator control signal in response to the command data, and supplying the actuator control signal to the actuator. The method may further comprise receiving at least two sensor signals from at least two different sensors, converting the sensor signals into a predetermined data format and communicating the sensor data in a single event message.

In the method, the receipt of a sensor signal may trigger the local controller to communicate the sensor data to the central controller.

Alternatively, the command data may trigger the controller to send sensor data to the central controller, e.g. in the case where the current sensor data indicates that the command data cannot be carried out.

In the method, the command data may be received by the local controller in response to said communication of the sensor data to the central controller.

The method may further comprise determining whether to override said steps of communicating the sensor data to the central controller and receiving the command data from the central controller, based on the sensor signal and/or the sensor data, and then to autonomously generate the command data.

Hence, if it is decided to override, the local controller will itself generate the command data and carry it out, without prior communication with the central controller.

According to a third aspect, there is provided a stop device for use in a conveyor system, which is configured to transport a plurality of workpiece carriers by means of a conveyor, the device being configured for stopping a movement of one of the workpiece carriers relative to the conveyor. The stop device comprises a stop control detection device, configured to detect a presence of a workpiece carrier, arriving at the detection device and/or to detect presence of a workpiece on the workpiece carrier, and a stop control actuation device, configured to stop the workpiece carrier's movement relative to the conveyor, a tag reader and/or writer, and a stop local controller, operatively connected to the stop control detection device, to the stop actuation device and to the tag reader/writer, to receive a detection signal from the stop control detection device, to send a control signal to the stop control actuation device, and to receive/send tag data from/to the tag reader/writer. The stop local controller is configured to receive the sensor signal from the stop control detection device, control the stop control actuator to stop the workpiece carrier in response to the sensor signal, receive tag data from the tag reader/writer, communicate the sensor data corresponding to the sensor signal and the tag data to a central controller in the form of a stop event message, receive a stop control command from the central controller, said command comprising an indication to release the workpiece carrier and/or an indication on data to write to the tag, and control the stop control actuator to release the workpiece carrier.

The stop local controller may be configured to receive the stop control command in response to said communication of the sensor data to the central controller.

The tag data may comprise ID data and/or address data, and the stop control command may comprise an indication to write amended ID data and/or tag data. The stop device may further comprise a workpiece carrier arrival detector, a workpiece carrier in position detector, and/or a workpiece presence detector. The stop event message further comprises data indicating arrival of a workpiece carrier at the stop flow controller, data indicating whether the workpiece carrier is in a predetermined stop position, and/or data indicating whether a workpiece is present.

The stop device may further comprise at least one area status detector, configured to detect presence of a workpiece carrier at a downstream side of the stop control actuation device, and wherein the stop event message further comprises data indicating whether the area is clear or not.

A merge device may be provided, for use in a conveyor system, which is configured to transport a plurality of workpiece carriers by means of a conveyor, and which comprises at least one Y-cross with at least two incoming conveyor lines and an outgoing line, the merge device being configured for selectively directing incoming workpiece carriers to the outgoing conveyor line. The described above associated with a respective one of the incoming conveyor lines.

The local controller may be configured to determine, based on the sensor signal, tag data and/or sensor data, whether to override said steps of communicating the sensor data to the central controller and receiving the command data from the central controller, and then to autonomously generate the stop control command.

According to a fourth aspect, there is provided a switch device for use in a conveyor system, which is configured to transport a plurality of workpiece carriers by means of a conveyor, and which comprises at least one Y-cross with an incoming conveyor line and a greater number of outgoing conveyor lines, the switch device being configured for selectively diverting one of the workpiece carriers to one of the outgoing conveyor. The switch device comprises a switch actuation device, configured to selectively divert the workpiece carrier from the conveyor, a switch area status detector, configured to detect a presence of a workpiece carrier at a downstream side of the switch actuation device, and a switch local controller, operatively connected to the switch actuation device and to the switch area status detector, to send a control signal to the switch actuation device and to receive a detection signal from the area status detector. The local controller is configured to receive a switch control command via a data interface from a central controller, receive a detection signal from the switch area status detector, and send a switch reply message indicating switch area status and switch position via the data interface to the central controller.

A merge/switch device may be provided, for use in a conveyor system, which is configured to transport a plurality of workpiece carriers by means of a conveyor, and which comprises a merge/switch cross having at least two incoming conveyor lines and at least two outgoing conveyor lines. The merge/divide device comprises first and second stop devices as described above associated with a respective one of the incoming conveyor lines, and a switch device as described above, arranged downstream of the stop control actuation devices.

The switch local controller may be configured to send the switch reply message in response to having received the switch control command.

The switch local controller is configured to determine, based on the detection signal, or on tag data received from a tag reader, whether to override said receiving the switch control command from the central controller and said sending a switch reply message, and to autonomously control the switch actuation device to assume a predetermined position. According to a fifth aspect, there is provided a conveyor system, comprising:

a plurality of workpiece carriers, each adapted for supporting at least one workpiece during transportation, a conveyor, adapted for transporting the workpiece carriers, at least one stop device as described above, configured to stop a workpiece carrier's movement along the conveyor, and a central controller, which is in data communication with the stop device, and having a memory device containing a flow plan containing comprising data describing an intended flow of workpieces in the conveyor system. The central controller is configured to receive the stop event message from the stop device, based on the tag data and the flow plan, determine whether to release the workpiece carrier, and send the stop control command to the stop device.

The central controller may be configured to determine whether to release the workpiece carrier and send the stop control command in response to receiving the stop event message.

The conveyor system may further comprise at least one Y-cross with an incoming conveyor line and a greater number of outgoing conveyor lines, at least one switch device as described above, associated with the Y-cross. In such case, the central controller may be further configured to generate the switch control command based on the flow plan, and send the switch control command to the switch device.

The central controller may be further configured to receive the switch reply message from the switch device, and to determine whether to release the workpiece carrier also based on the switch position and/or switch area status.

The switch device may be arranged downstream the stop control actuation device, and the central controller may be further configured to determine to which outgoing line the workpiece carrier is to be directed based on the tag data and on the flow plan, and send a switch control command to the switch device, indicating a desired switch position.

The central controller may be further configured to receive a switch reply message from the switch device, indicating a current switch position and switch area status, and to determine whether to release the workpiece carrier and/or to which outgoing conveyor line to direct such released workpiece carrier also based on the switch position and/or switch area status.

The conveyor system may further comprise at least one Y-cross with at least two incoming conveyor lines and an outgoing line and at least one merge device as described above. The central controller may thus be further configured to receive a second stop event message from the stop devices, said stop event messages comprising tag data, based on the stop event messages, tag data and flow plan, determine whether to release any workpiece carrier, and send the stop control command to one of the stop devices.

The conveyor system may further comprise at least one Y-cross with at least two incoming conveyor lines and at least two outgoing conveyor lines, and at least one merge/switch device as described above. The central controller is thus further configured to receive a stop event messages from the stop devices, said stop event message comprising tag data, based on the event messages, tag data and flow plan, determine whether to release any workpiece carrier, and to which outgoing conveyor line to direct such released workpiece carrier, send a switch control command to the switch device, indicating a desired switch position, and send the stop control command to one of the stop devices.

In one alternative, the conveyor may be configured to provide at least one merge with at least two incoming conveyor lines and an outgoing line, wherein the workpiece carrier sensor comprises a stop control detection device on each incoming conveyor line, configured to detect a presence of a workpiece carrier, arriving at the detection device and/or to detect presence of a workpiece on the workpiece carrier, and the actuator may comprise a respective stop control actuation device on each incoming conveyor line, configured to stop the workpiece carrier's (WPC) movement relative to the conveyor.

The workpiece carrier sensor may comprise at least one merge area status detector, configured to detect a presence of a workpiece carrier at a downstream side of the stop control actuation devices. The stop device further comprises a respective tag reader and/or writer on each incoming conveyor. The local controller may be a merge local controller, operatively connected to the stop detection devices, to the stop actuation devices and to the tag readers/writers, to receive a detection signal from the stop detection devices, to receive an area status signal from the merge area status detector, to send a control signal to the stop actuation devices, and to receive/send tag data from/to the tag readers/writers. The local controller is configured to receive the sensor signal from at least one of the stop control detection devices, receive tag data from the associated tag reader/writer, receive an area status from the merge area status detector, communicate data corresponding to the sensor signal, the area status and the tag data to the central controller in the form of a merge event message, receive a merge control command from the central controller, said command comprising at least one of an indication on which stop control actuation device to allow to release its workpiece carrier, and control the actuator to release the workpiece carrier.

According to another aspect, there is provided a production system comprising at least two operating stations selected from a group consisting of a machining station, an additive manufacturing station, a surface treatment station and an assembly station, the production system comprising a conveyor system as described above, configured to convey workpieces from one of the operating stations to another one of the operating stations.

DETAILED DESCRIPTION

Figure 1:
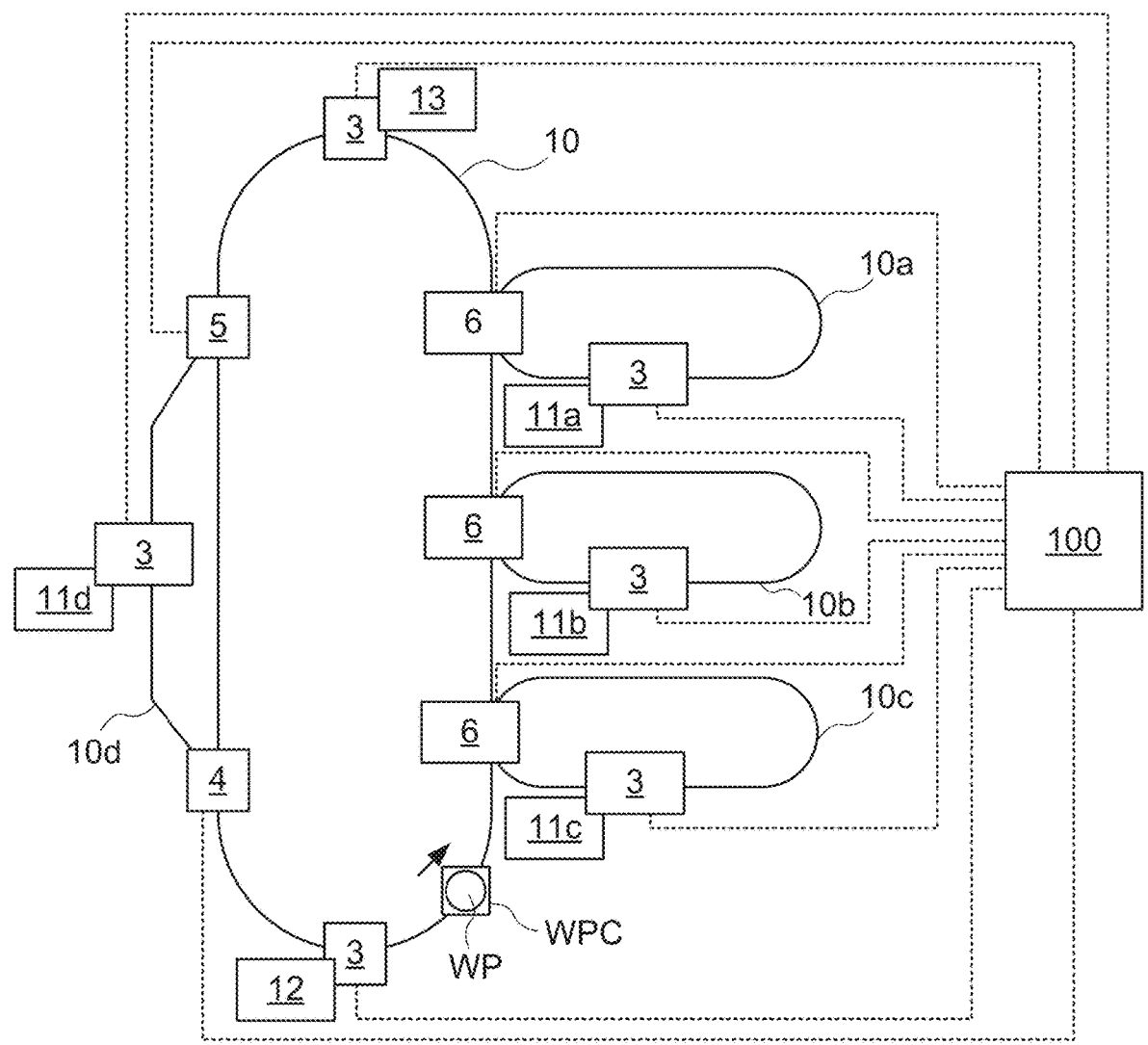
FIG. 1 is a schematic diagram drawing of a conveyor system according the present disclosure.

The system according to the present disclosure is a system for transporting workpieces WP between operation stations 11a, 11b, 11c, 11d. The workpieces WP are transported on workpiece carriers WPC. To main conveyor(s) 10, one or more operation unit conveyors 10a, 10b, 10c and one side track 10d are connected. Each operation unit conveyor 10a, 10b, 10c or side track 10d is adapted to convey workpieces from the associated main conveyor 10 to an operation station 11a, 11b, 11c, 11d, where an operation, or a loading or off-loading is carried out on the workpiece.

FIG. 1 schematically illustrates a conveyor system comprising a main conveyor 10, three work station conveyors 10a, 10b, 10c, a side track conveyor 10d, a loading station 12, an unloading station 13 and a plurality of work stations 11a, 11b, 11c, 11d. A plurality of workpiece carriers WPC are provided to carry workpieces WP between different stations 11a, 11b, 11c, 11d serviced by the conveyor system.

Each workpiece carrier and/or each workpiece may comprise an id tag by which the workpiece carrier or the workpiece may be identified. Such tag may comprise an id which is unique to a specific workpiece, or an id which is identical to every workpiece that is at the same point in a production process.

Hence, in the system disclosed herein, workpieces may be transported on workpiece carriers that ensure proper interaction with the conveyor belt. The workpiece carrier may comprise a conveyor interface, which may be designed to make sure the workpiece carrier will properly follow the conveyor when it is intended to move, and which may allow relative movement between the conveyor and the workpiece carrier when the workpiece is to be stopped. The workpiece carrier may also comprise a workpiece interface that may be adapted to make sure the workpiece is safely carried by the workpiece carrier. The tag, which may be machine readable and/or writable, may be provided on the workpiece carrier, rather than on the workpiece.

At work stations 11a, 11b, 11c, 11d and at loading stations 12 and unloading stations 13, there are provided stop devices 3, which will be further described with reference to FIG. 2.

At conveyor divides, there is provided a switch device 4, which will be further described with reference to FIG. 3.

At conveyor mergers, there is provided a merger arrangement 5, which will be further described with reference to FIG. 4.

At conveyor merger/divides, there is provided a merger/divide arrangement 6, which will be further described with reference to FIG. 5.

All flow devices 3, 4, 5, 6 are in data communication with a central controller 100 such that data can be sent from the respective local controller to the central controller 100 and data can be received by the local controller from the central controller 100.

The central controller 100 contains a processing device and a memory containing flow data indicating how products are to be guided through the system. For example, the central controller may contain a description of the production process and a record of all workpiece carriers and/or workpieces that are in the system. The central controller 100 may thus associate each workpiece carrier and/or workpiece with an indicator on its stage in the production process.

Communication between the central controller 100 and the local controllers 34 may be effected through a data communication interface in the form of a wired interface, such as a wired serial interface (e.g. RS232, USB, CAN) or a wireless interface, such as Wi-Fi, Bluetooth, or the like.

Figure 2:
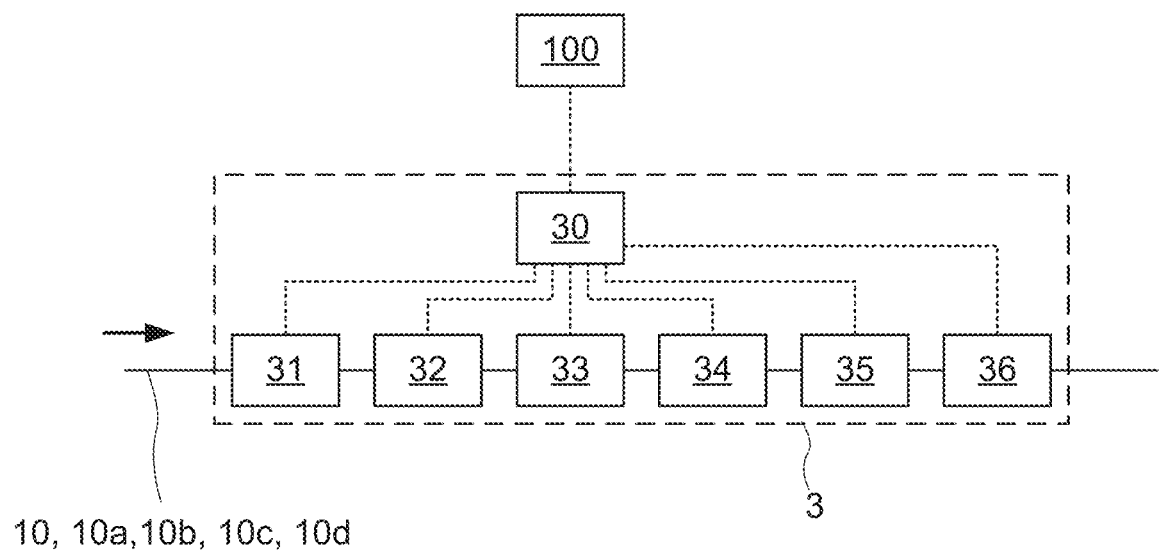
FIG. 2 is a schematic diagram drawing of stop device.

FIG. 2 schematically illustrates a stop device, i.e. a device which has the function of stopping a workpiece carrier arriving on the conveyor, and subsequently, to release it.

The stop device 3 comprises a local controller 30, which may comprise a processing device, a memory and interfaces for receiving sensor signals and providing control signals. The local controller 30 also has a communication interface for communicating with the central controller 100.

The stop device 3 may comprise a workpiece carrier arrival detector 31, i.e. a detector which is configured for detecting a moving workpiece carrier which is arriving on the conveyor. The detection may be mechanical, optical (camera, photocell, laser distance), radar, acoustic (ultra sound) or capacitive. A single detector may use two or more detection technologies.

The stop device 3 may comprise a workpiece carrier in position detector 32, i.e. a detector that is configured for detecting that the workpiece carrier is in a predetermined position. Preferably, the detector is configured for detecting that the workpiece carrier is stationary at this predetermined position, as a result of the workpiece carrier having been successfully stopped by the stop device. The detection may be mechanical, optical (camera, photocell, laser distance), radar, acoustic (ultra sound) or capacitive. A single detector may use two or more detection technologies The stop device 3 may comprise a workpiece detector 33, i.e. a detector that is arranged for detecting whether a workpiece is present on the workpiece carrier WPC or not. The detection may be mechanical, optical (camera, photocell, laser distance), radar, acoustic (ultra sound) or capacitive. A single detector may use two or more detection technologies The stop device 3 comprises a tag reader and/or writer 34, i.e. a device for reading a tag on the workpiece carrier or on the workpiece, that contains data by which the workpiece carrier or workpiece can be identified. In some applications, a tag reader is sufficient, such as for any application where it is only desirable to identify the workpiece carrier or workpiece, or in applications where it is not desirable to keep updated data on the workpiece carrier or on the workpiece itself. This may be the case where the entire production log is kept in the central controller 100.

However, in some situations, it may be desirable to update tag data. This may be done if some decision power is to be delegated to flow devices 3, 4, 5, 6.

The tag may be read through any reading technology, including, but not limited to RFID, NFC, optical, magnetic, capacitive, etc.

The stop device 3 further comprises a stop actuator 35, i.e. a device which mechanically halts the workpieces carrier's movement relative to the conveyor. The actuator may be an electrically powered actuator. Alternatively, the actuator may be hydraulically or pneumatically powered under the control of the controller 30. The stop actuator 35 may comprise an arm or a shoulder, which e.g. is rotatably or translatably movable between a passive position, where it does not affect the workpiece carrier's movement and an active position, where it blocks the workpiece carrier's movement relative to the conveyor.

The stop device 3 may further comprise an area status detector 36 configured to determine whether an area downstream of the actuator 35 is free or not. Typically, this area may be in the immediate vicinity of the actuator 35, such as within 1-10 workpiece carrier lengths and/or upstream of any immediately subsequent flow device 4, 5, 6. The detection may be mechanical, optical (camera, photocell, laser distance), radar, acoustic (ultra sound) or capacitive. A single detector may use two or more detection technologies.

The operation of the local controller 30 of the stop device 3 is as follows.

When a workpiece carrier WPC arrives at the stop device 3, it is detected by the workpiece carrier arrival detector 31, which provides a signal to the local controller 30. The local controller provides a stop signal to the stop actuator 35, whereby the actuator 35 causes the workpiece carrier to stop its movement relative to the conveyor 10, 10a, 10b, 10c, 10d. Once, the workpiece carrier WPC has been stopped, the workpiece carrier in position detector 32 then provides a workpiece carrier in position signal to the local controller 30.

The workpiece detector 33 (optionally) detects whether there is a workpiece present on the workpiece carrier WPC and provides a corresponding signal to the local controller 30.

The tag reader 34 reads the tag data and forwards the tag data to the local controller 30.

The area status detector 36 (optionally) detects whether its monitored area downstream of the stop actuator 35 is clear or not and provides an area status signal to the local controller 30.

The local controller 30, based on the signals from the sensors 32, 33, 34, 36 provides a stop event message to the central controller 100, containing information indicating that a workpiece carrier has arrived and is in a stationary position, (optionally) whether a workpiece is present or not, the identity of the workpiece carrier or workpiece and (optionally) an indication on area status. Further optionally, the stop event message may comprise information identifying the stop device.

The local controller 30 may provide an updated stop event message at any point if any of the sensor data would change. For example, a workpiece may be loaded onto the workpiece carrier, such that the workpiece detector signal changes, or the area downstream of the actuator 35 may become cleared, thus changing the area status detector signal.

As a main rule, the local controller 30 will maintain the workpiece carrier in the stopped state until it receives a stop control command from the central controller 100.

The central controller 100 receives the stop event message and determines what action is to be taken by the stop device 3 based on the flow plan.

The central controller 100 may determine that the workpiece carrier should not be released, e.g. when there is no workpiece present, when the downstream area is not clear or when there is a queue to a subsequent work station 11a, 11b, 11c, 11d. In this case, no stop control command is sent.

Once the central controller 100 determines that the workpiece carrier can be released, a stop control command is sent to the local controller 30 of the stop device 3.

The stop control command may comprise an indication that the workpiece carrier is to be released. Optionally, the stop control command may comprise tag data that is to be written by the tag reader/writer 34 to the tag of the workpiece carrier. Yet optionally, the stop control command may comprise identification information for identifying the stop device 3 for which the stop control command is intended.

Hence, the stop control command is issued in response to a specific stop event message, meaning that the decision on what action the local controller is to take based on the arrival of the workpiece carrier is taken by the central controller rather than by the local controller. That is, the stop control command is issued in real time.

Figure 3:
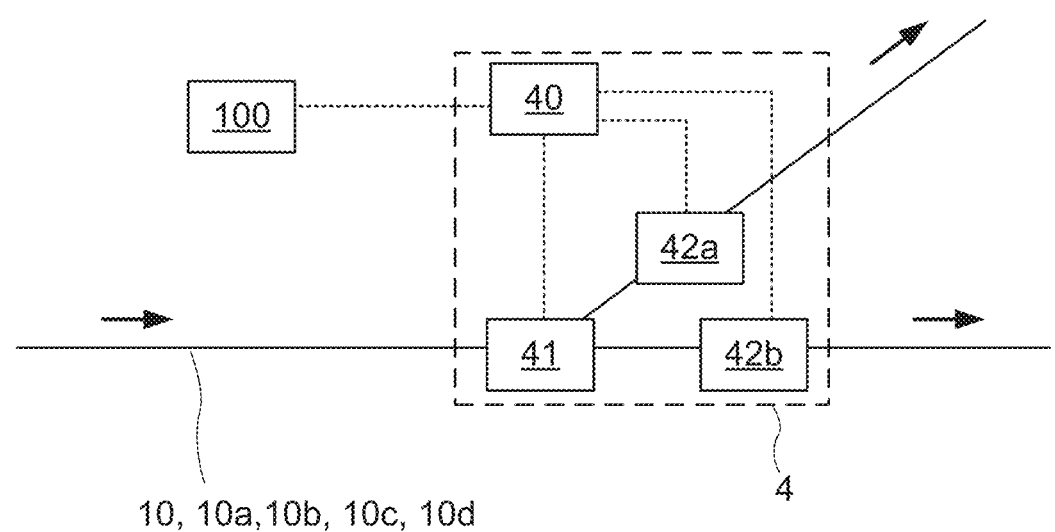
FIG. 3 is a schematic diagram drawing of a switch device.

FIG. 3 schematically illustrates a switch device 4, i.e. a device which has the function of diverting a workpiece carrier from an incoming conveyor line to one of at least two outgoing conveyor lines.

The switch device 4 comprises a local controller 40, which may comprise a processing device, a memory and interfaces for receiving sensor signals and providing control signals. The local controller 40 also has a communication interface for communicating with the central controller 100.

The switch device 4 comprises a switch actuator 41, i.e. an actuator that is capable of switching between at least two positions to divert the workpiece carrier to one of at least two outgoing conveyor lines. The switch actuator may comprise an arm or the line, which may be controllably pivotable about a vertical axis. The actuator may be an electrically powered actuator. Alternatively, the actuator may be hydraulically or pneumatically powered under the control of the local controller 40.

The switch actuator may comprise a switch position detector or memory, based on which feedback on switch position may be provided to the local controller 40.

The switch device 4 may further comprise a respective area status detector 42a, 42b configured to determine whether an area downstream of the actuator 41 is free or not. Typically, this area may be in the immediate vicinity of the actuator 41, such as within 1-10 workpiece carrier lengths and/or upstream of any immediately subsequent flow device 3, 5, 6.

The operation of the switch device 4 will now be described.

Operation of the switch device is typically initiated by a switch command from the central controller 100. Such command may be provided based on knowledge that a workpiece carrier is about to arrive to the switch device 4. Typically, such knowledge is obtained by the central controller 100 from a stop device 3 which is arranged immediately upstream of the switch device 4. That is, the central controller 100 will typically provide a switch control command to the switch device 4 before it provides a stop control command to an immediately preceding stop device 3.

The switch control command typically comprises an indication of a desired switch position. Optionally, it may contain information identifying the intended switch device 4.

On receipt of the switch control command, the local controller 40 will check whether the area to which diversion is ordered is free by means of the relevant area status detector 42a, 42b and it may check which position the switch is in.

If the area is free and the switch is in the correct position, a reply message from the switch device 4 will indicate the switch position (or merely that it is as ordered) and the relevant area status detector status (or merely that it is free to proceed as ordered). Optionally, information identifying the switch device 4 may be included as well. On receipt of such message, the central controller 100 may send the stop control command to the immediately upstream stop device 3.

Hence, the reply message is sent from the switch device 4 in response to a specific request by the central controller. That is, the reply message is sent in real time.

If the area is free and the switch is in the correct position, the reply message will be similar, but delayed until the switch has reached the desired position.

If the area is not free, the reply message from the switch device 4 will indicate that area is blocked. In such case the central controller 100 will not send the stop control command.

An updated reply message will be generated if the area status detector status changes to free, in which case the central controller 100 may send the stop control command.

Hence, the stop control command to the upstream stop device 3 will not be sent by the central controller 100 until a reply message indicating desired switch position and area status free has been received by the central controller 100.

Figure 4:
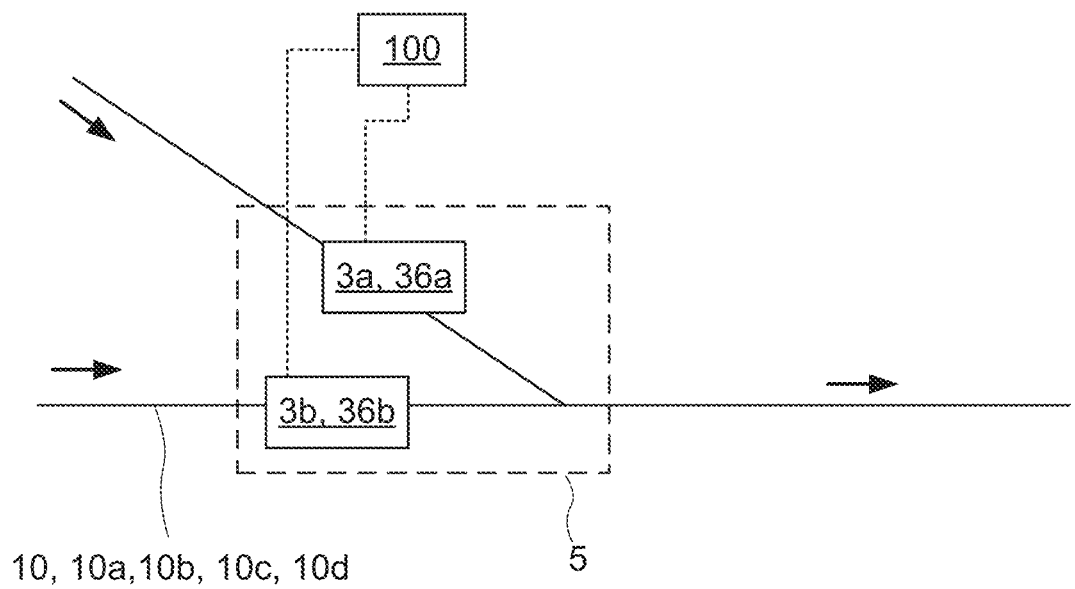
FIG. 4 is a schematic diagram drawing of a merge arrangement.

FIG. 4 schematically illustrates a merge arrangement 5, i.e. an arrangement for handling a merger of at least two incoming conveyor lines into one conveyor line.

Basically, the merge arrangement comprises a pair of stop devices 3a, 3b, at least one of which (preferably both) comprising an area status detector 36a, 36b, which is configured to monitor a status of a merge area, i.e. an area where a pair of workpiece carriers could collide if arriving sufficiently simultaneously.

Each of the stop devices 3a, 3b may be designed and function as indicated above with reference to FIG. 2.

Hence, the description will be directed to the operation of the merge arrangement 5.

On arrival of a workpiece carrier at one of the stop devices 3a, 3b, a corresponding stop event message will be generated to the central controller 100.

The central controller 100 will determine whether one or both stop devices 3a, 3b have reported that their respective downstream area is clear (based on the area status detector 36a, 36b), and if both are clear, and send the stop control command to the relevant stop device 3a, 3b.

If workpiece carriers arrive at both stop devices 3a, 3b simultaneously, the central controller 100 will have to decide which one to prioritize, and thus, when the downstream area is clear, send the stop control command to the stop device 3a, 3b at which the prioritized workpiece carrier is.

Figure 5:
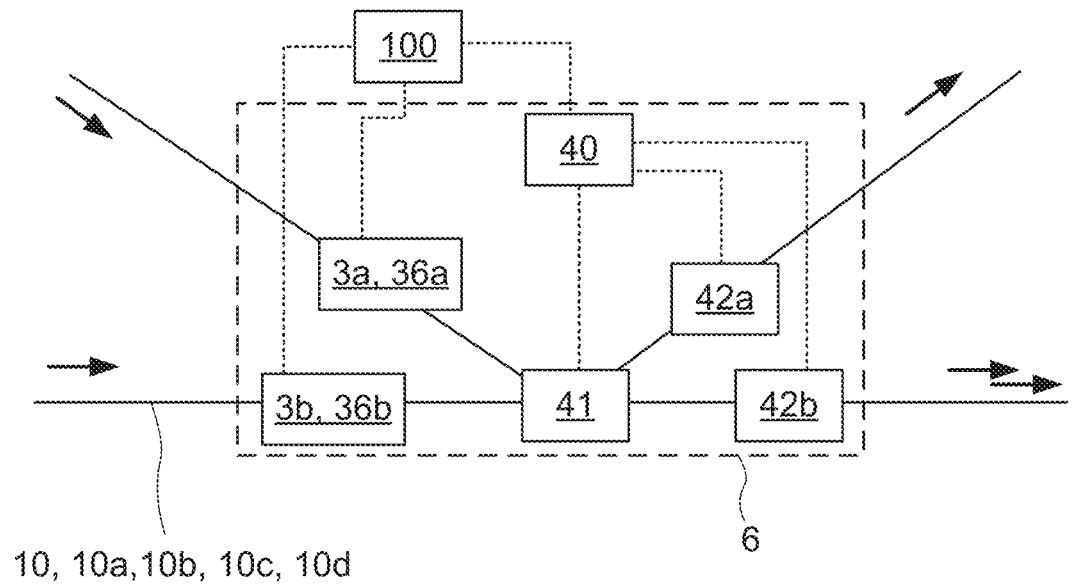
FIG. 5 is a schematic diagram drawing of a merge/divide arrangement.

FIG. 5 schematically illustrates a merge/divide arrangement 6, i.e. an arrangement for handling a merger of at least two incoming conveyor lines with at least two outgoing conveyor lines.

The merge/divide arrangement essentially consists of a merge arrangement as described with reference to FIG. 5 and a divide arrangement as described with reference to FIG. 4.

That is, the stop devices 3a, 3b will be operated to control which workpiece carrier is allowed to proceed to the divide switch actuator 41.

The switch actuator 41 may in this case have two or more positions, depending on the design of the conveyors. For example, in a case with two endless conveyors, such as chain conveyors where one tangents the other, it may be advantageous with three positions or four positions, such that each combination of incoming and outgoing line can be achieved optimally.

A flow device 3, 4, 5, 6 may be provided in the form of a device unit comprising a casing which houses the local controller and which provides connections for sensors, actuators, power supply and communication interface. Sensors and actuators are connected to the unit as needed.

It is possible to design a single hardware unit, which may be capable of different operating modes, such it, depending on operation mode, may operate as a stop device 3, a switch device 4, etc.

When communicating with the central controller, the local controller may send data enabling the central controller to identify it, such as flow device id data.

A message to the central controller may further comprise an indication of flow device status, error codes and/or a code indicating configuration code, i.e. indicating what type of device it is acting as (i.e. a stop device or a switch device).

The embodiments discussed above are based on the concept that all decisions that affect the flow of workpiece carriers are taken by the central controller. Hence, every time a local controller receives a sensor input, such as the detection of a workpiece carrier, information of this is communicated to the central controller and no action is taken until command data has been received from the central controller.

On the other hand, some very basic operations are delegated to the local controllers, such as, as described above, the decision to stop an arriving workpiece carrier. That is, only the decision to release it needs to be taken by the central controller.

It is possible to allow further, albeit not complete, delegation of tasks to the local controllers. For example, the local controller may be configured to make some decisions based on its sensor data, whereby the steps of communicating with the central controller may be overridden or bypassed.

One such example is to allow the local controller to make the decision in the event it detects an empty workpiece carrier, or a workpiece carrier that carries an incorrectly arranged or damaged workpiece. As such workpiece carriers may be bound for a particular destination, such as a buffer, a scrapping station or a manual handling station, they may be allowed to proceed towards such destinations without the communication with the central controller.

The tag carried by such workpiece carriers may thus be updated to indicate that the workpiece carrier is one for which the local controllers are allowed to make the decision. For example, it is possible to, upon discovery that the workpiece is missing or damaged, write an indication thereof to the tag, such that its status changes from centrally controlled to locally controlled.

Moreover, it is possible to allow local control for a sub-series of operations. For example, the central controller may control the workpiece carrier up to an entry point into such a sub-series of operations, whereby, during or after each operation, the tag data is updated, and when the sub-series of operations is completed, control of the workpiece carrier is taken over by the central controller.

In the case of a stop controller, the overriding decision may be to immediately release the workpiece carrier when a certain condition is met. In the case of a switch controller, the overriding decision may be to immediately divert the workpiece carrier.

The invention claimed is:

1. A conveyor system, comprising:
   a plurality of workpiece carriers, each adapted for supporting at least one workpiece during transportation;
   a conveyor adapted for transporting the workpiece carriers,
   at least one flow device for controlling a movement of one of the workpiece carriers relative to the conveyor, the flow device comprising a local controller, at least one workpiece carrier sensor and at least one actuator, and
   a central controller, which is in data communication with the flow device, and having a memory containing a flow plan comprising data describing an intended flow of workpieces in the conveyor system,
   wherein the local controller is configured to:
   receive a sensor signal via a signal interface,
   convert the sensor signal into signal data having a predetermined data format,
   communicate the sensor data to the central controller via a data interface,
   receive command data from the central controller via the data interface, and
   provide an actuator control signal to the actuator based on the command data,
   wherein the flow device is a stop device for stopping a movement of one of the workpiece carriers relative to the conveyor,
   wherein the workpiece carrier sensor comprises a stop control detection device, configured to detect a presence of a workpiece carrier, arriving at the detection device and/or to detect presence of a workpiece on the workpiece carrier, and
   wherein the actuator comprises a stop control actuation device, configured to stop the workpiece carrier's movement relative to the conveyor,
   wherein the stop device further comprises a tag reader and/or writer; and
   wherein the local controller is a stop local controller, operatively connected to the stop control detection device, to the stop control actuation device and to the tag reader/writer, to receive a detection signal from the stop control detection device, to send a control signal to the stop control actuation device, and to receive/send tag data from/to the tag reader/writer; and
   wherein the stop local controller is configured to:
   receive the sensor signal from the stop control detection device,
   receive tag data from the tag reader/writer,
   communicate the sensor data corresponding to the sensor signal and the tag data to the central controller in the form of a stop event message,
   receive a stop control command from the central controller, said command comprising an indication to release the workpiece carrier and/or an indication on data to write to the tag, and
   control the actuator to release the workpiece carrier.

2. The conveyor system as claimed in claim 1, wherein the local controller is configured to determine, based on the sensor signal and/or sensor data, whether to override said steps of communicating the sensor data to the central controller and receiving the command data from the central controller, and then to autonomously generate the command data.

3. The conveyor system as claimed in claim 2, wherein the local controller is configured to autonomously provide the command data when it determines that the workpiece carrier does not carry a valid workpiece.

4. The conveyor system as claimed in claim 1, wherein the local controller is configured to receive the command data in response to said communication of the sensor data.

5. The conveyor system as claimed in claim 1, wherein the central controller is configured to:
   receive the sensor data from the local controller,
   determine an action to be taken by the flow device based on the flow plan and on the sensor data,
   provide the command data to correspond to the action, and
   send the command data to the local controller.

6. The system as claimed in claim 1, wherein the local controller is configured to communicate the sensor data to the central controller only when triggered by a change in sensor data, or by the command data.

7. The conveyor system as claimed in claim 1, wherein the tag data comprises ID data and/or address data, and wherein the stop control command comprises an indication to write amended ID data and/or tag data.

8. The conveyor system, as claimed in claim 1, wherein said conveyor is configured to provide at least one Y-cross with an incoming conveyor line and a greater number of outgoing conveyor lines and wherein the flow device is a switch device for selectively diverting a an incoming workpiece carrier to one of the outgoing conveyor lines,
   wherein the actuator comprises a switch actuation device, configured to selectively divert the workpiece carrier to said one of the outgoing conveyor lines,
   wherein the workpiece carrier sensor comprises a switch area status detector, configured to detect a presence of a workpiece carrier at a downstream side of the switch actuation device, and
   wherein the local controller comprises a switch local controller, operatively connected to the switch actuation device and to the switch area status detector, to send a control signal to the switch actuation device and to receive a detection signal from the area status detector; and
   wherein the local controller is configured to:
   receive a switch control command from the central controller,
   receive a signal from the switch area status detector, and
   send a switch reply message indicating switch area status and switch position.

9. The conveyor system as claimed in claim 8, wherein the central controller is configured to:
   determine to which outgoing line the workpiece carrier is to be directed based on the flow plan,
   send the switch control command to the switch device, indicating a desired switch position, and
   receive the switch reply message.

10. The conveyor system as claimed in claim 8, wherein the local controller is configured to determine, based on the sensor signal or sensor data, whether to override said receiving the switch control command from the central controller, said receiving a the signal from the switch area status detector and said sending a switch reply message, and to autonomously control the switch actuation device to assume a desired position.

11. A production system comprising at least two operating stations selected from a group consisting of a machining station, an additive manufacturing station, a surface treatment station and an assembly station, the production system comprising a conveyor system as claimed in claim 1 configured to convey workpieces from one of the operating stations to another one of the operating stations.

12. A conveyor system, comprising:
a plurality of workpiece carriers, each adapted for supporting at least one workpiece during transportation;
a conveyor, adapted for transporting the workpiece carriers,
at least one stop device, configured to stop a workpiece carrier's movement along the conveyor, and
a central controller, which is in data communication with the stop device, and having a memory device containing a flow plan containing comprising data describing an intended flow of workpieces in the conveyor system,
wherein the stop device comprises:
a stop control detection device, configured to detect a presence of a workpiece carrier, arriving at the detection device and/or to detect presence of a workpiece on the workpiece carrier, and
a stop control actuation device, configured to stop the workpiece carrier's movement relative to the conveyor,
a tag reader and/or writer; and
a stop local controller, operatively connected to the stop control detection device, to the stop actuation device and to the tag reader/writer, to receive a detection signal from the stop control detection device, to send a control signal to the stop control actuation device, and to receive/send tag data from/to the tag reader/writer;
wherein the stop local controller is configured to:
receive the sensor signal from the stop control detection device,
control the stop control actuator to stop the workpiece carrier in response to the sensor signal,
receive tag data from the tag reader/writer,
communicate the sensor data corresponding to the sensor signal and the tag data to a central controller in the form of a stop event message,
receive a stop control command from the central controller, said command comprising an indication to release the workpiece carrier and/or an indication on data to write to the tag, and
control the stop control actuator to release the workpiece carrier,
wherein the central controller is configured to:
receive the stop event message from the stop device,
based on the tag data and the flow plan, determine whether to release the workpiece carrier, and
send the stop control command to the stop device.

13. The conveyor system as claimed in claim 12, wherein the central controller is configured to determine whether to release the workpiece carrier and send the stop control command in response to receiving the stop event message.

14. The conveyor system as claimed in claim 12, further comprising:
at least one Y-cross with an incoming conveyor line and a greater number of outgoing conveyor lines,
at least one switch device, associated with the Y-cross, wherein the switch device comprises:
a switch actuation device, configured to selectively divert the workpiece carrier from the conveyor,
a switch area status detector, configured to detect a presence of a workpiece carrier at a downstream side of the switch actuation device, and
a switch local controller, operatively connected to the switch actuation device and to the switch area status detector, to send a control signal to the switch actuation device and to receive a detection signal from the area status detector;
wherein the local controller is configured to:
receive a switch control command via a data interface from a central controller,
receive a detection signal from the switch area status detector, and
send a switch reply message indicating switch area status and switch position via the data interface to the central controller, and
wherein the central controller is configured to:
generate the switch control command based on the flow plan, and
send the switch control command to the switch device,
is further configured to receive the switch reply message from the switch device, and to determine whether to release the workpiece carrier also based on the switch position and/or switch area status.

15. The conveyor system as claimed in claim 12, wherein the switch device is arranged downstream of the stop control actuation device, and wherein the central controller is further configured to:
determine to which outgoing line the workpiece carrier is to be directed based on the tag data and on the flow plan, and
send a switch control command to the switch device, indicating a desired switch position.

16. The conveyor system as claimed in claim 14, wherein the central controller is further configured to receive a switch reply message from the switch device, indicating a current switch position and switch area status, and to determine whether to release the workpiece carrier and/or to which outgoing conveyor line to direct such released workpiece carrier also based on the switch position and/or switch area status.

17. A production system comprising at least two operating stations selected from a group consisting of a machining station, an additive manufacturing station, a surface treatment station and an assembly station, the production system comprising a conveyor system as claimed in claim 12 configured to convey workpieces from one of the operating stations to another one of the operating stations.

* * * * *